(12) United States Patent
Auernhammer

(10) Patent No.: US 12,434,004 B1
(45) Date of Patent: Oct. 7, 2025

(54) MEDICAMENT DELIVERY DEVICE

(71) Applicant: Genzyme Corporation, Cambridge, MA (US)

(72) Inventor: Daniel Auernhammer, Frankfurt am Main (DE)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 19/052,872

(22) Filed: Feb. 13, 2025

(51) Int. Cl.
*A61M 5/31* (2006.01)
*A61M 5/315* (2006.01)

(52) U.S. Cl.
CPC .... *A61M 5/31501* (2013.01); *A61M 5/31571* (2013.01); *A61M 5/3158* (2013.01); *A61M 2005/31508* (2013.01)

(58) Field of Classification Search
CPC ...... A61M 5/31566; A61M 2005/2073; A61M 2005/208
See application file for complete search history.

(56) References Cited

U.S. PATENT DOCUMENTS 3,712,301 A * 1/1973 Sarnoff ............... A61M 5/2033
604/136
5,300,030 A * 4/1994 Crossman .......... A61M 5/31511
604/157

FOREIGN PATENT DOCUMENTS

FR          2506161 A  * 11/1982  .......... A61M 5/2066
WO  WO-2012085022 A1  *  6/2012  .......... A61M 5/2033

OTHER PUBLICATIONS

Needle-based injection systems for medical use requirements and test methods, Part 1: Needle injection systems, ISO 11608 1:2014(E), Third Edition, Switzerland, ISO, Dec. 15, 2014, pp. 1-13.

* cited by examiner

*Primary Examiner* — William R Carpenter
(74) *Attorney, Agent, or Firm* — Fish & Richardson P.C.

(57) ABSTRACT

A medicament delivery device for injecting medicament comprises a body 301 comprising a distal end, a proximal end, and a longitudinal axis extending from the distal end to the proximal end. A plunger rod is configured to be movable in a distal direction of the body, the plunger rod comprising a plunger rod engagement surface. A locking element is moveable from a first position to a second position. In the first position, movement of the plunger rod in the distal direction is prevented. In the second position, movement of the plunger rod in the distal direction is permitted. A release member is configured to be moveable from a blocking position in which the release member is configured to prevent the locking element from moving to a release position in which the release member is configured to permit the locking element to.

18 Claims, 6 Drawing Sheets

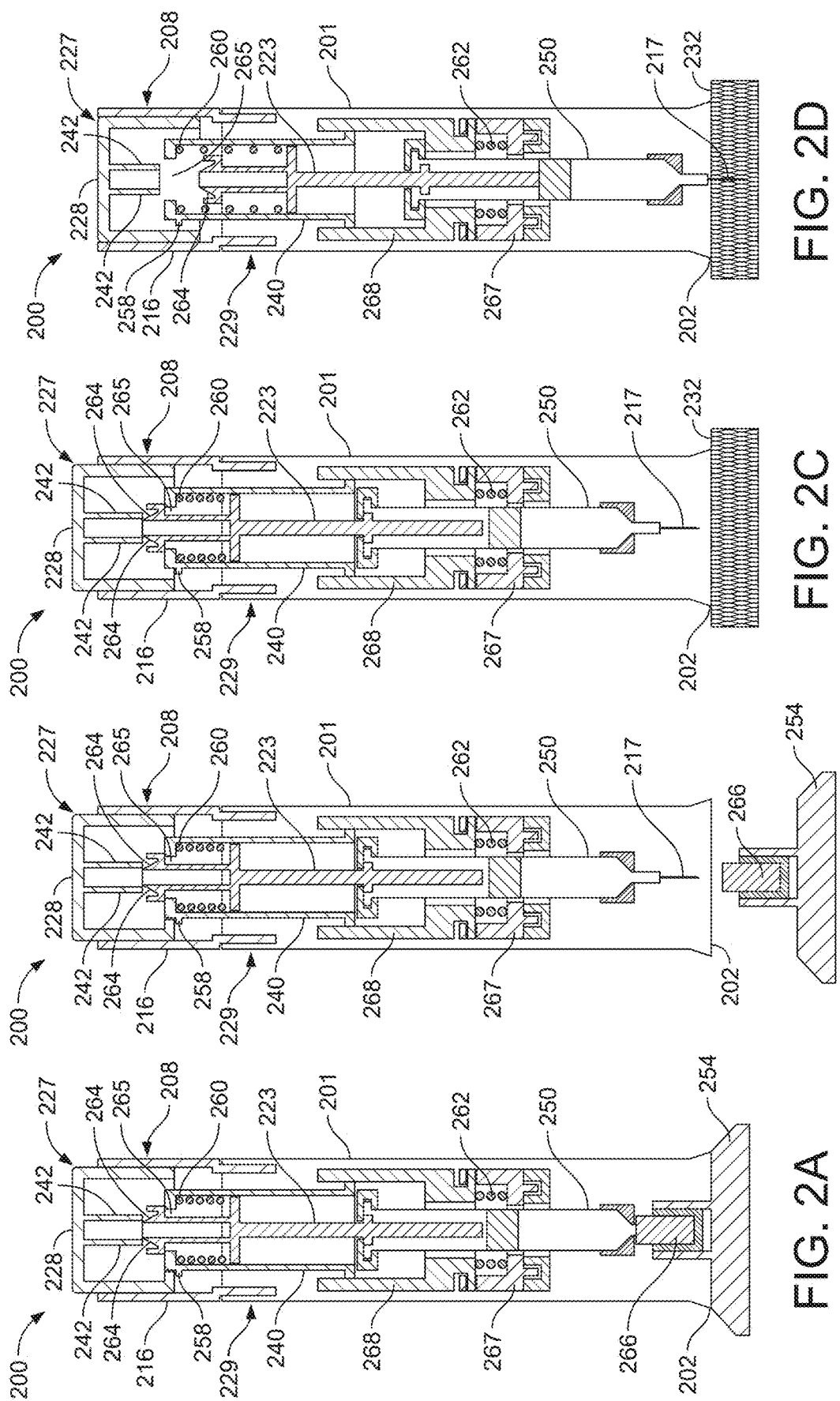

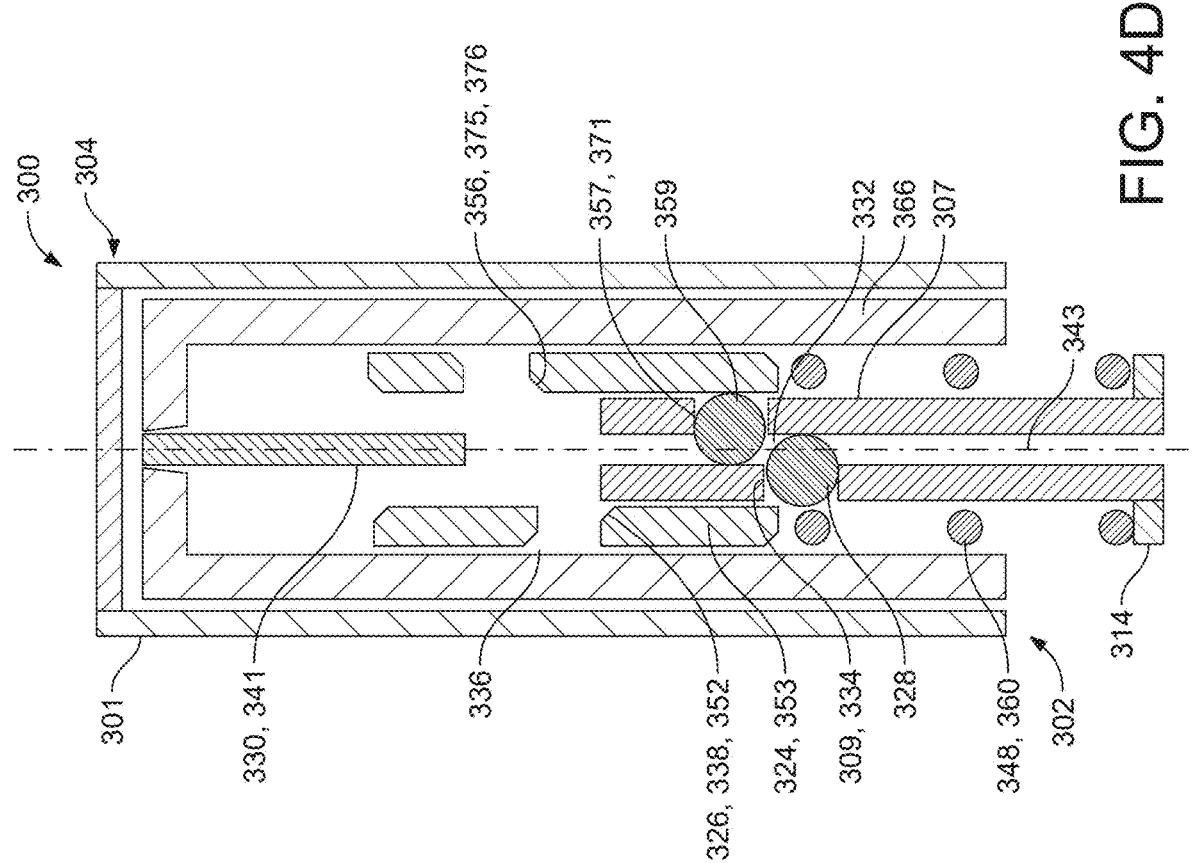
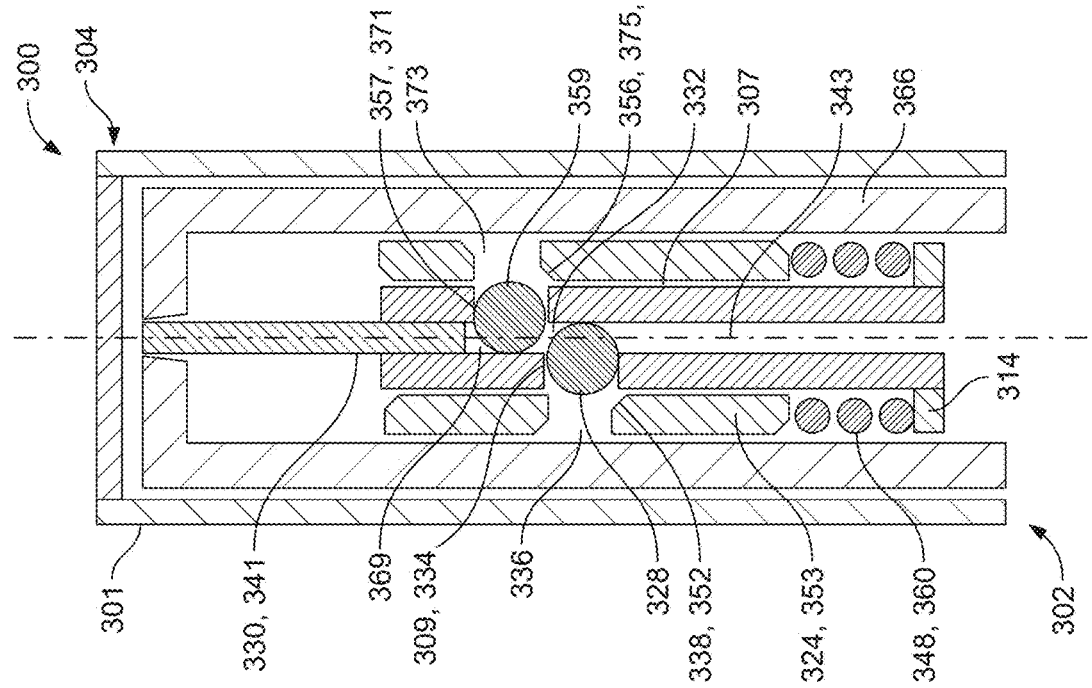

MEDICAMENT DELIVERY DEVICE

TECHNICAL FIELD

The present disclosure relates to a medicament delivery device and to a method of using a medicament delivery device.

BACKGROUND

Medicament delivery devices, such as auto-injectors, are known in the art for dispensing medicament to an injection site of a patient. In some cases, medicament delivery devices comprise a plunger rod which is held by a release mechanism in a pre-use configuration against a biasing force provided by a plunger rod bias, the biasing force being configured to bias the plunger rod in a distal direction of the device.

The present disclosure seeks to provide an alternative and/or improved medicament delivery device, for example a medicament delivery device which is more compact.

SUMMARY

According to a first aspect, there is provided a medicament delivery device for injecting medicament, wherein the medicament delivery device comprises:
- a body comprising a distal end, a proximal end and a longitudinal axis extending from the distal end to the proximal end;
- a plunger rod configured to be movable in a distal direction of the body, the plunger rod comprising a plunger rod engagement surface;
- a catch restrained in the distal direction with respect to the body, the catch comprising a catch engagement surface;
- a locking element moveable from a first position to a second position;
- wherein, in the first position, the locking element is configured to be in engagement with the plunger rod engagement surface and the catch engagement surface such that movement of the plunger rod in the distal direction is prevented;
- wherein, in the second position, the locking element is configured to be in engagement with the plunger rod engagement surface but not the catch engagement surface such that movement of the plunger rod in the distal direction is permitted; and
- a release member configured to be moveable from a blocking position in which the release member is configured to prevent the locking element from moving from the first position to the second position to a release position in which the release member is configured to permit the locking element to move from the first position to the second position.

In some embodiments, in the first position, the locking element is arranged between the plunger rod engagement surface and the catch engagement surface such that movement of the plunger rod in the distal direction is prevented.

In some embodiments, the plunger rod comprises a plunger rod aperture, wherein a wall of the plunger rod aperture comprises the plunger rod engagement surface.

In some embodiments, the catch comprises a catch aperture, wherein a wall of the catch aperture comprises the catch engagement surface.

In some embodiments, in the first position, the locking element is received by the plunger rod aperture and by the catch aperture and, in the second position, the locking element is received by the plunger rod aperture but the locking element is not received by the catch aperture so as to not be in engagement with the catch engagement surface such that movement of the plunger rod in the distal direction is permitted.

In some embodiments, a greater portion of the locking element is received by the plunger rod aperture in the second position than in the first position. In some embodiments, the release member is configured so as to allow a greater portion of the locking element to be received by the plunger rod aperture in the release position than in the blocking position. In some embodiments, the release member is configured so as to allow the locking element to move further radially inwards in the release position than in the blocking position.

In some embodiments, the release member is configured to at least partially occupy the plunger rod aperture when the release member is in the blocking position so as to prevent the locking element from moving to the second position.

In some embodiments, the release member is moveable with respect to the plunger rod in a proximal direction from the blocking position to the release position.

In some embodiments, the release member comprises a longitudinally extending pin slidably received within a longitudinally extending aperture provided within the plunger rod.

In some embodiments, the body is configured to receive a medicament container comprising a needle and wherein the medicament delivery device comprises a needle shield configured to be movable in a proximal direction from an extended position in which the needle shield is configured to cover the needle of the medicament container when the medicament container is received by the body to a retracted position in which the needle shield is configured to expose the needle of the medicament container when a medicament container is received by the body, the needle being exposed for injection, wherein the release member is coupled to the needle shield such that movement of the needle shield from the extended position to the retracted position causes the release member to move from the blocking position to the release position.

In some embodiments, the catch and the plunger rod are configured to be received within the needle shield when the release member is in the release position.

In some embodiments, the locking element is substantially spherical or cylindrical.

In some embodiments, in the first position, the locking element is biased into the second position.

In some embodiments, the medicament delivery device comprises a plunger rod bias configured to provide a biasing force to bias the plunger rod in the distal direction.

In some embodiments, the plunger rod bias is configured to bias the plunger rod and the catch apart in a longitudinal (e.g. distal) direction.

In some embodiments, the plunger rod bias comprises a compression spring, wherein the compression spring is configured to extend around the plunger rod.

In some embodiments, the catch engagement surface comprises a ramped surface such that, when the locking element is in the first position, the locking element is in engagement with the ramped surface such that the biasing force provided by the plunger rod bias is reacted to the locking element via the ramped surface so as to bias the locking element to the second position.

In some embodiments, the locking element is configured to move radially (e.g. radially inwardly) between the first position and the second position.

In some embodiments, the catch comprises a collar arranged to extend peripherally around the plunger rod when the locking element is in the first position.

In some embodiments, the catch engagement surface is a first catch engagement surface, the plunger rod engagement surface is a first plunger rod engagement surface, the locking element is a first locking element and wherein the catch comprises a second catch engagement surface, the plunger rod comprises a second plunger rod engagement surface, and wherein the medicament delivery device comprises a second locking element moveable from a first position to a second position, wherein, in the first position, the second locking element is configured to be in engagement with the second plunger rod engagement surface and the second catch engagement surface such that movement of the plunger rod in the distal direction is prevented, wherein, in the second position, the second locking element is configured to be in engagement with the second plunger rod engagement surface but not the second catch engagement surface such that movement of the plunger rod in the distal direction is permitted, wherein, in the blocking position of the release member, the release member is configured to prevent the second locking element from moving from the first position to the second position and wherein, in the release position, the release member is configured to permit the second locking element to move from the first position to the second position.

In some embodiments, the first and second locking elements are substantially diametrically opposed with respect to the plunger rod or about the longitudinal axis of the body.

In some embodiments, the first and second locking elements are spaced apart from each other in the distal direction.

In some embodiments, the plunger rod aperture is first plunger rod aperture and wherein the plunger rod comprises a second plunger rod aperture, wherein a wall of the second plunger rod aperture comprises the second plunger rod engagement surface.

In some embodiments, the catch aperture is a first catch aperture and wherein the catch comprises a second catch aperture, wherein a wall of the second catch aperture comprises the second catch engagement surface.

In some embodiments, in the first position of the second locking element, the second locking element is received by the second plunger rod aperture and by the second catch aperture and, in the second position of the second locking element, the second locking element is received by the second plunger rod aperture but the second locking element is not received by the second catch aperture so as to not be in engagement with the second catch engagement surface such that movement of the plunger rod in the distal direction is permitted.

In some embodiments, a greater portion of the second locking element is received by the second plunger rod aperture in the second position of the second locking element than in the first position of the second locking element.

In some embodiments, the release member is configured to at least partially occupy the second plunger rod aperture when the release member is in the blocking position so as to prevent the second locking element from moving to the second position.

In some embodiments, the second locking element is substantially spherical or cylindrical.

In some embodiments, in the first position of the second locking element, the second locking element is biased into the second position of the second locking element.

In some embodiments, the second catch engagement surface comprises a ramped surface such that, when the second locking element is in the first position of the second locking element, the second locking element is in engagement with the ramped surface of the second catch engagement surface such that the biasing force provided by the plunger rod bias is reacted to the second locking element via the ramped surface of the second catch engagement surface so as to bias the second locking element to the second position of the second locking element.

In some embodiments, the second locking element is configured to move radially (e.g. radially inwardly) between the first position of the second locking element and the second position of the second locking element. In some embodiments, the first and second locking elements are configured to move in opposite directions between their respective first and second positions.

According to another aspect, there is provided a method of operating a medicament delivery device, the medicament delivery device comprising:
  a body comprising a distal end, a proximal end and a longitudinal axis extending from the distal end to the proximal end;
  a plunger rod configured to be movable in a distal direction of the body, the plunger rod comprising a plunger rod engagement surface;
  a catch restrained in the distal direction with respect to the body, the catch comprising a catch engagement surface;
  a locking element moveable from a first position to a second position;
  wherein, in the first position, the locking element is configured to be in engagement with the plunger rod engagement surface and the catch engagement surface such that movement of the plunger rod in the distal direction is prevented;
  wherein, in the second position, the locking element is configured to be in engagement with the plunger rod engagement surface but not the catch engagement surface such that movement of the plunger rod in the distal direction is permitted; and
  a release member configured to be moveable from a blocking position in which the release member is configured to prevent the locking element from moving from the first position to the second position to a release position in which the release member is configured to permit the locking element to move from the first position to the second position;
the method comprising:
  moving the release member from the blocking position to the release position so as to permit the locking element to move from the first position to the second position so as to permit the plunger rod to move in a distal direction of the body.

In some embodiments, the body is configured to receive a medicament container comprising a needle and wherein the medicament delivery device comprises a needle shield configured to be movable in a proximal direction from an extended position in which the needle shield is configured to cover the needle of the medicament container when the medicament container is received by the body to a retracted position in which the needle shield is configured to expose the needle of the medicament container when a medicament container is received by the body, the needle being exposed for injection, wherein the release member is coupled to the needle shield such that movement of the needle shield from the extended position to the retracted position causes the release member to move from the blocking position to the release position;

the method comprising the step of moving the needle shield from the extended position to the retracted position so as to cause the release member to move from the blocking position to the release position so as to permit the locking element to move from the first position to the second position so as to permit the plunger rod to move in a distal direction of the body.

In some embodiments, the medicament delivery device comprises a plunger rod bias configured to provide a biasing force to bias the plunger rod in the distal direction and wherein the method comprises the step of causing the plunger rod to move in the distal direction under the action of the biasing force provided by the plunger rod bias.

In some embodiments, the catch engagement surface comprises a ramped surface such that, when the locking element is in the first position, the locking element is in engagement with the ramped surface such that the biasing force provided by the plunger rod bias is reacted to the locking element through the ramped surface so as to bias the locking element to the second position;

the method comprising the step of:
moving the release member from the blocking position to the release position so as to cause the locking element to move from the first position to the second position under the action of the biasing force provided by the plunger rod bias so as to permit the plunger rod to move in a distal direction of the body.

According to another aspect, there is provided a medicament delivery device for injecting medicament, wherein the medicament delivery device comprises:
a body comprising a distal end, a proximal end and a longitudinal axis extending from the distal end to the proximal end;
a plunger rod configured to be movable in a distal direction of the body, the plunger rod comprising a plunger rod aperture;
a catch restrained in the distal direction with respect to the body, the catch comprising a catch aperture;
a locking element moveable from a first position to a second position;
wherein, in the first position, the locking element is configured to be received by the plunger rod aperture and to protrude laterally therefrom so as to engage the catch aperture such that movement of the plunger rod in the distal direction is prevented;
wherein, in the second position, the locking element is configured to be received by the plunger rod aperture, the locking element being arranged so as to not engage the catch aperture such that movement of the plunger rod in the distal direction is permitted; and
a release member configured to be moveable from a blocking position in which the release member at least partially occupies the plunger rod aperture so as to prevent the locking element from moving from the first position to the second position to a release position in which the release member is configured to permit the locking element to move from the first position to the second position.

In some embodiments, the medicament delivery device further comprises a plunger rod bias configured to provide a biasing force to bias the plunger rod in the distal direction away from the catch, the catch aperture comprising a catch engagement surface comprising a ramped surface such that, when the locking element is in the first position, the locking element is in engagement with the ramped surface such that the biasing force provided by the plunger rod bias is reacted to the locking element through the ramped surface so as to bias the locking element to the second position.

According to another aspect, there is provided a method of operating a medicament delivery device for injecting medicament, the medicament delivery device comprising:
a body comprising a distal end, a proximal end and a longitudinal axis extending from the distal end to the proximal end;
a plunger rod configured to be movable in a distal direction of the body, the plunger rod comprising a plunger rod aperture;
a catch restrained in the distal direction with respect to the body, the catch comprising a catch aperture;
a locking element moveable from a first position to a second position;
wherein, in the first position, the locking element is configured to be received by the plunger rod aperture and to protrude laterally therefrom so as to engage the catch aperture such that movement of the plunger rod in the distal direction is prevented;
wherein, in the second position, the locking element is configured to be received by the plunger rod aperture, the locking element being arranged so as to not engage the catch aperture such that movement of the plunger rod in the distal direction is permitted; and
a release member configured to be moveable from a blocking position in which the release member at least partially occupies the plunger rod aperture so as to prevent the locking element from moving from the first position to the second position to a release position in which the release member is configured to permit the locking element to move from the first position to the second position;
wherein the method comprises the step of:
moving the release member from the blocking position to the release position so as to permit the locking element to move from the first position to the second position so as to permit the plunger rod to move in the distal direction of the body.

According to another aspect, there is provided a method of manufacturing or assembling a medicament delivery device, wherein the medicament delivery device includes the features of any of the medicament delivery devices described and/or contemplated herein. Further optional features of the medicament delivery device are described and/or contemplated here.

According to another aspect, there is provided a method of manufacturing or assembling a medicament delivery device, wherein the medicament delivery device has the features of any of the medicament delivery devices described and/or contemplated herein.

BRIEF DESCRIPTION OF THE DRAWINGS

Embodiments will now be described, by way of example only, with reference to the accompanying drawings, in which:

FIG. 2A is a schematic view of a medicament delivery device prior to use (i.e. in a pre-use configuration);

FIG. 2B is a schematic view of the device of FIG. 2A with the cap removed;

FIG. 2C is a schematic view of the device of FIG. 2A showing the device placed at an injection site;

FIG. 2D is a schematic view of the device of FIG. 2A with the button having been pressed to release the dispensing mechanism;

FIG. 4C is a schematic cross-sectional view of the medicament delivery device of FIG. 3 in which a second locking element has moved to from a first position to a second position as the needle shield of the device moves further in the proximal direction towards a retracted position; and FIG. 4D is a schematic cross-sectional view of the medicament delivery device of FIG. 3 in which a plunger rod of the device is permitted to move in a distal direction as a result of the first and second locking elements being in their respective second positions, the plunger rod being caused to move in distal direction under the action of a plunger rod bias.

DETAILED DESCRIPTION

Figure 1A:
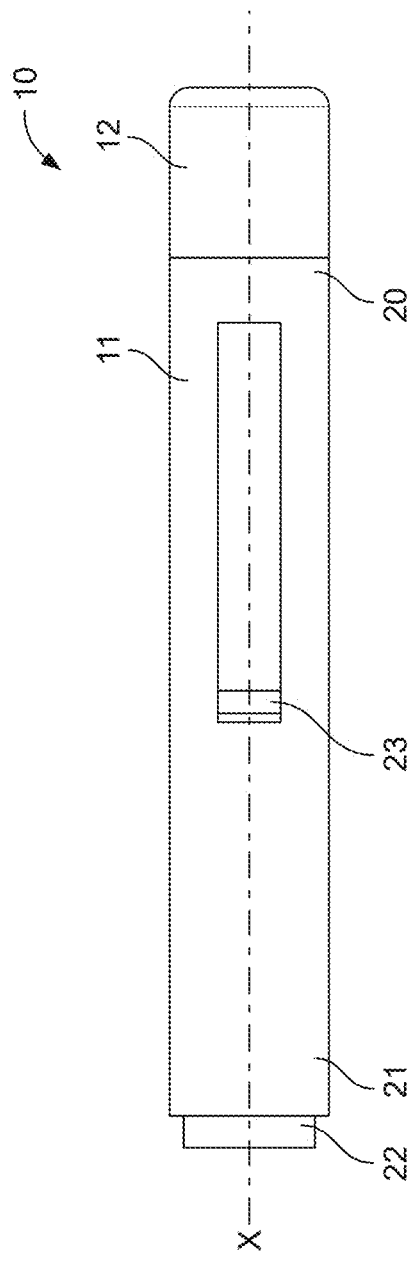
FIG. 1A is a schematic view of a medicament delivery device with a cap attached.

A drug delivery device, as described herein, may be configured to inject a medicament into a patient. For example, delivery could be sub-cutaneous, intra-muscular, or intravenous. Such a device could be operated by a patient or care-giver, such as a nurse or physician, and can include various types of safety syringe, pen-injector, or auto-injector. The device can include a cartridge-based system that requires piercing a sealed ampule before use. Volumes of medicament delivered with these various devices can range from about 0.5 ml to about 2 ml. Yet another device can include a large volume device ("LVD") or patch pump, configured to adhere to a patient's skin for a period of time (e.g., about 5, 15, 30, 60, or 120 minutes) to deliver a "large" volume of medicament (typically about 2 ml to about 10 ml).

In combination with a specific medicament, the presently described devices may also be customized in order to operate within required specifications. For example, the device may be customized to inject a medicament within a certain time period (e.g., about 3 to about 20 seconds for auto-injectors, and about 10 minutes to about 60 minutes for an LVD). Other specifications can include a low or minimal level of discomfort, or to certain conditions related to human factors, shelf-life, expiry, biocompatibility, environmental considerations, etc. Such variations can arise due to various factors, such as, for example, a drug ranging in viscosity from about 3 cP to about 50 cP. Consequently, a drug delivery device will often include a hollow needle ranging from about 25 to about 31 Gauge in size. Common sizes are 27 and 29 Gauge.

The delivery devices described herein can also include one or more automated functions. For example, one or more of needle insertion, medicament injection, and needle retraction can be automated. Energy for one or more automation steps can be provided by one or more energy sources. Energy sources can include, for example, mechanical, pneumatic, chemical, or electrical energy. For example, mechanical energy sources can include springs, levers, elastomers, or other mechanical mechanisms to store or release energy. One or more energy sources can be combined into a single device. Devices can further include gears, valves, or other mechanisms to convert energy into movement of one or more components of a device.

The one or more automated functions of an auto-injector may each be activated via an activation mechanism. Such an activation mechanism can include one or more of a button, a lever, a needle sleeve, or other activation component. Activation of an automated function may be a one-step or multi-step process. That is, a user may need to activate one or more activation components in order to cause the automated function. For example, in a one-step process, a user may depress a needle sleeve against their body in order to cause injection of a medicament. Other devices may require a multi-step activation of an automated function. For example, a user may be required to depress a button and retract a needle shield in order to cause injection.

In addition, activation of one automated function may activate one or more subsequent automated functions, thereby forming an activation sequence. For example, activation of a first automated function may activate at least two of needle insertion, medicament injection, and needle retraction. Some devices may also require a specific sequence of steps to cause the one or more automated functions to occur. Other devices may operate with a sequence of independent steps.

Some delivery devices can include one or more functions of a safety syringe, pen-injector, or auto-injector. For example, a delivery device could include a mechanical energy source configured to automatically inject a medicament (as typically found in an auto-injector) and a dose setting mechanism (as typically found in a pen-injector).

Figure 1B:
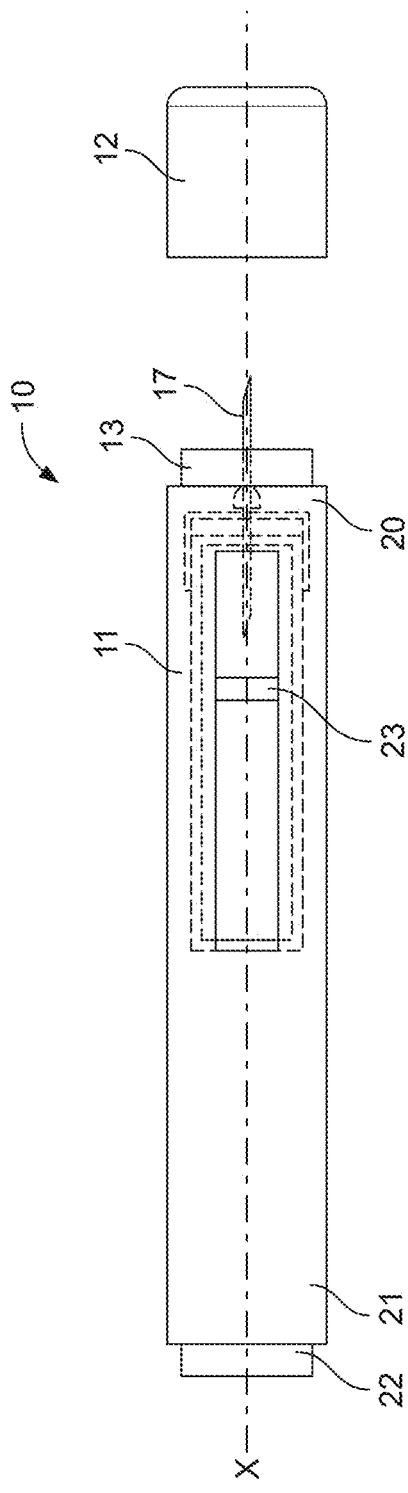
FIG. 1B is a schematic view of the medicament delivery device of FIG. 1A with the cap removed.

According to some embodiments of the present disclosure, an exemplary drug delivery device 10 is shown in FIGS. 1A & 1B. Device 10, as described above, is configured to inject a medicament into a patient's body. Device 10 includes a housing 11 which typically contains a reservoir containing the medicament to be injected (e.g., a syringe) and the components required to facilitate one or more steps of the delivery process. Device 10 can also include a cap assembly 12 that can be detachably mounted to the housing 11. Typically a user must remove cap 12 from housing 11 before device 10 can be operated.

As shown, housing 11 is substantially cylindrical and has a substantially constant diameter along the longitudinal axis X. The housing 11 has a distal region 20 and a proximal region 21. The term "distal" refers to a location that is relatively closer to a site of injection, and the term "proximal" refers to a location that is relatively further away from the injection site.

Device 10 can also include a needle sleeve 13 coupled to housing 11 to permit movement of sleeve 13 relative to housing 11. For example, sleeve 13 can move in a longitudinal direction parallel to longitudinal axis X. Specifically, movement of sleeve 13 in a proximal direction can permit a needle 17 to extend from distal region 20 of housing 11.

Insertion of needle 17 can occur via several mechanisms. For example, needle 17 may be fixedly located relative to housing 11 and initially be located within an extended needle sleeve 13. Proximal movement of sleeve 13 by placing a distal end of sleeve 13 against a patient's body and moving housing 11 in a distal direction will uncover the distal end of needle 17. Such relative movement allows the distal end of needle 17 to extend into the patient's body. Such insertion is termed "manual" insertion as needle 17 is manually inserted via the patient's manual movement of housing 11 relative to sleeve 13.

Another form of insertion is "automated," whereby needle 17 moves relative to housing 11. Such insertion can be triggered by movement of sleeve 13 or by another form of activation, such as, for example, a button 22. As shown in FIGS. 1A & 1B, button 22 is located at a proximal end of housing 11. However, in other embodiments, button 22 could be located on a side of housing 11.

Other manual or automated features can include drug injection or needle retraction, or both. Injection is the process by which a bung or piston 23 is moved from a proximal location within a syringe (not shown) to a more distal location within the syringe in order to force a medicament from the syringe through needle 17. In some embodiments, a drive spring (not shown) is under compression before device 10 is activated. A proximal end of the drive spring can be fixed within proximal region 21 of housing 11, and a distal end of the drive spring can be configured to apply a compressive force to a proximal surface of piston 23. Following activation, at least part of the energy stored in the drive spring can be applied to the proximal surface of piston 23. This compressive force can act on piston 23 to move it in a distal direction. Such distal movement acts to compress the liquid medicament within the syringe, forcing it out of needle 17.

Following injection, needle 17 can be retracted within sleeve 13 or housing 11. Retraction can occur when sleeve 13 moves distally as a user removes device 10 from a patient's body. This can occur as needle 17 remains fixedly located relative to housing 11. Once a distal end of sleeve 13 has moved past a distal end of needle 17, and needle 17 is covered, sleeve 13 can be locked. Such locking can include locking any proximal movement of sleeve 13 relative to housing 11.

Another form of needle retraction can occur if needle 17 is moved relative to housing 11. Such movement can occur if the syringe within housing 11 is moved in a proximal direction relative to housing 11. This proximal movement can be achieved by using a retraction spring (not shown), located in distal region 20. A compressed retraction spring, when activated, can supply sufficient force to the syringe to move it in a proximal direction. Following sufficient retraction, any relative movement between needle 17 and housing 11 can be locked with a locking mechanism. In addition, button 22 or other components of device 10 can be locked as required.

FIGS. 2A to 2G show the sequential steps of operating a medicament delivery device 200. The medicament delivery device 200 is an autoinjector.

The device 200 comprises a body 201, a syringe 250 having a needle 217 and an axially moveable plunger 223 for dispensing medicament from the syringe 250. The device comprises a cap 254 which is removably attached to the body 201 and covers a distal end 202 of the body 201 for preventing access to the needle 217. The device has a needle shield 266 that covers the needle 217 before use. The needle shield 266 is attached to the cap 254.

The medicament delivery device 200 has a dispensing mechanism 229. The medicament delivery device 200 has an actuation member 227 which is configured to release the dispensing mechanism 229. The actuation member 227 is configured to engage the dispensing mechanism 229 to release the dispensing mechanism 229.

The dispensing mechanism 229 is configured to cause the needle 217 to move distally from a needle pre-use position, in which the needle 217 is recessed within the body 201, to an injection position in which the needle 217 protrudes from the distal end 202 of the body 201 when the dispensing mechanism 229 is released.

The dispensing mechanism 229 is configured to dispense the medicament from the needle 217 when the needle 217 is in the injection position.

As shown in FIGS. 2B-2C, in order to deliver a dose of medicament to an injection site, the cap 254 is removed (FIG. 2B) and the device is placed at an injection site 232 (FIG. 2C).

The actuation member 227 comprises a button 228 and is prevented from being depressed by a stop 258. The stop is provided on the spring guide 240, for example.

The device has a locking member 208 in the form of a lock ring 216 which is rotatable by a user about a longitudinal axis of the device. The actuation member 227 is keyed to the lock ring 216 so that the actuation member 227 rotates with the lock ring 216. The lock ring 216 is rotatable from a pre-use position, in which distal movement of the button 228 is prevented, to a use position in which distal movement of the button 228 is permitted.

When the lock ring 216 is in the pre-use position then the stop 258 engages the button 228 to prevent the button 228 from being depressed.

In order to allow the button 228 to be depressed, the lock ring 216 is rotated about the longitudinal axis of the device from the pre-use position to the use position. The rotation of the lock ring 216 also rotates the actuation member 227 to a position in which the stop 258 no longer prevents the button 228 from being depressed as shown, for example, in FIG. 2C.

Turning now to FIG. 2D, the user then presses the button 228 to release the dispensing mechanism 229 for dispensing medicament from the device. The dispensing mechanism 229 has a plunger 223 and a bias in the form of a compression spring 260. The plunger 223 is biased distally by the spring 260.

The dispensing mechanism 229 is at least partially housed within the spring guide 240. The plunger 223 has a release member which has proximally-extending clips 264. The spring 260 is retained in the compressed position by virtue of the clips 264 which protrude through a proximal opening 265 in the spring guide 240. The clips 264 engage the spring guide 240 for maintaining the plunger 223 in a proximal position.

The actuation member 227 has a firing member comprising a pair of protrusions 242 which engage with the clips 264 when the button 228 is depressed to flex the clips 264 radially inwardly thereby allowing the clips 264 to move distally through the proximal opening 265 to release the spring 260.

When the dispensing mechanism 229 is released, then the syringe 250 is released for distal axial movement towards the injection site 232 such that the needle 217 moves from the needle pre-use retracted position to an exposed (or "uncovered" or "injection") position for delivering medicament to the injection site 232 under the biasing force of the compression spring 260.

Figure 2G:
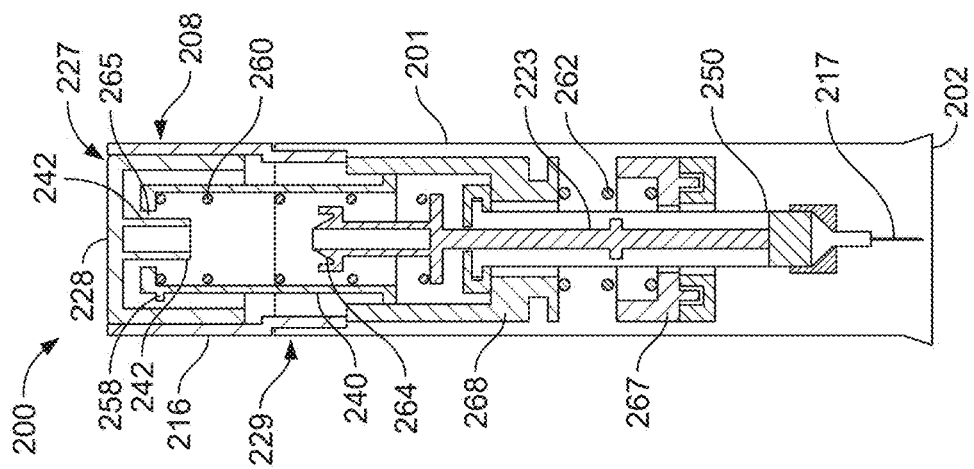
FIG. 2G is a schematic view of the device of FIG. 2A showing the device removed from the injection site after the needle has retracted within the device after delivery of the medicament.
Figure 2F:
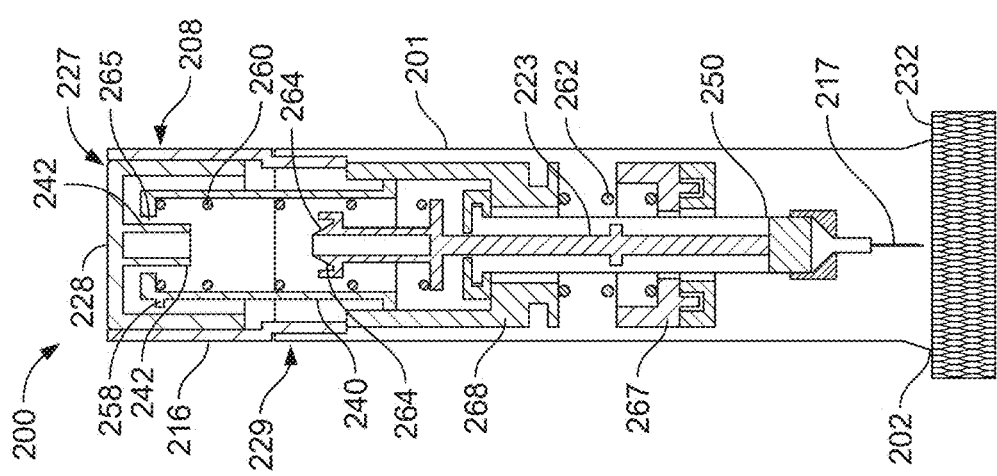
FIG. 2F is a schematic view of the device of FIG. 2A showing the needle having retracted within the device after a dose has been delivered.
Figure 2E:
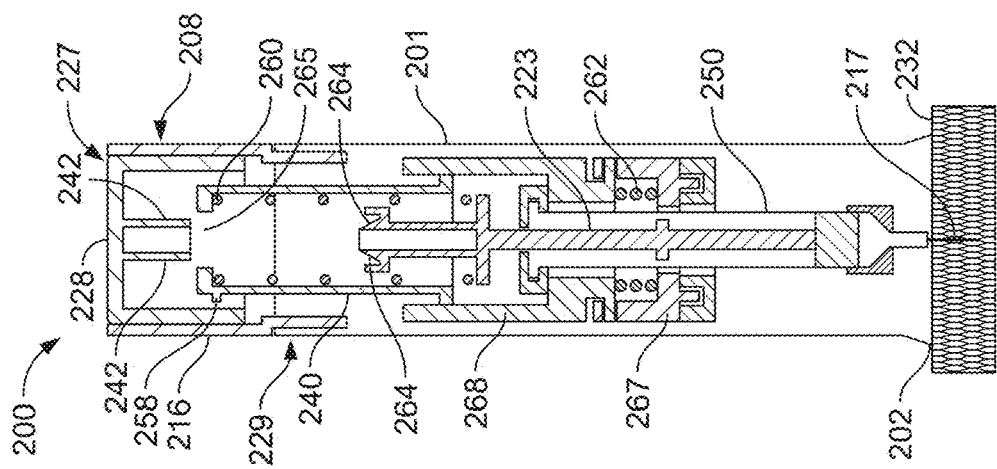
FIG. 2E is a schematic view of the device of FIG. 2A with the button having been pressed to release the dispensing mechanism.

Depressing the button 228 releases the plunger 223 which, biased by the bias 260, moves along the syringe 250 towards the distal end of the device 200 to force medicament within the syringe 250 through the needle 217, thereby delivering a dose of medicament as shown, for example in FIG. 2E.

As shown in FIG. 2F, once the dose of medicament has been delivered, a medicament container bias 262, embodied by a further spring 262, then causes the needle 217 to move axially back to the retracted position, away from the injection site 232 in a proximal direction. The plunger 223 flexes a clip (not shown) on a first collar 267 which allows the first collar 267 to rotate relative to the body 201 and relative to a second collar 268. The first collar 267 rotates from a first position in which the second collar 268 is axially coupled to the first collar 267, into a second position in which the second collar 268 is free to move axially relative to the first collar 267. For example, the second collar 268 may comprise a radially protruding coupling element configured to be received in or engage with a corresponding receiving portion of the first collar 267, such that rotating the first collar 267 from the first position into the second position causes the coupling element to be moved out from the receiving portion, to allow the second collar 268 to move axially relative to the first collar 267. Axial movement of the second collar 268 permits the needle 217 to be retracted.

As shown in FIG. 2G, the device 200 is then removed from the injection site 232, for disposal.

Figure 3:
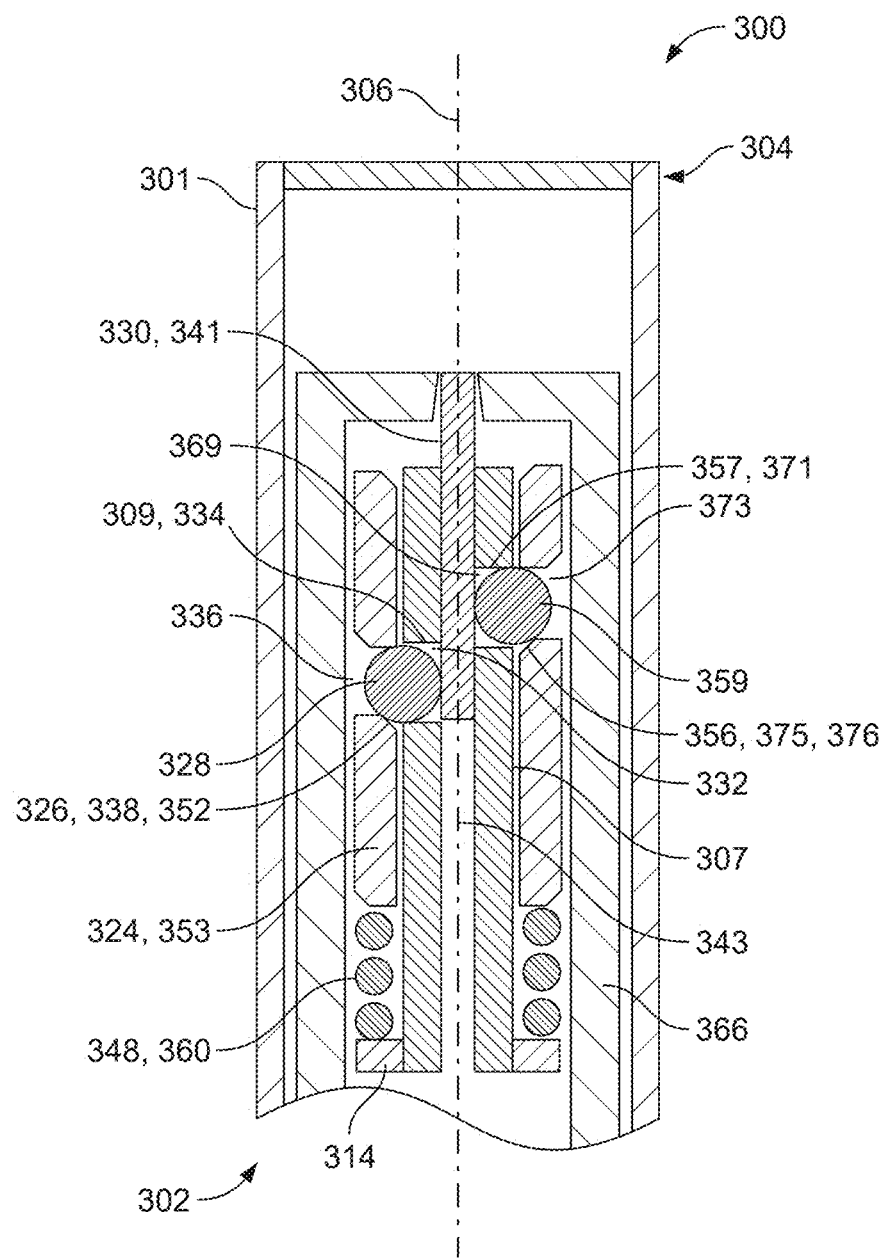
FIG. 3 is a schematic cross-sectional view of parts of a medicament delivery device prior to use (i.e. in a pre-use configuration)

FIG. 3 shows parts of a medicament delivery device 300 in a pre-use configuration. The device 300 of some embodiments may be an auto-injector. The device 300 comprises a body 301 having a distal end 302 and a proximal end 304. A longitudinal axis 306 extends from the distal end 302 to the proximal 304 end.

A plunger rod 307 is movable in a distal direction (that is, towards the distal end 302 of the body 301). A plunger rod bias 348 provides a biasing force to bias the plunger rod 307 in the distal direction. Distal movement of the plunger rod 307 causes a piston (not shown) to move distally so as to cause the dispensing of medicament from the device 300 when a medicament cartridge (not shown) is received within the body 301.

The plunger rod bias 348 in this embodiment comprises a compression spring 360 configured to extend around the plunger rod 307, although any suitable plunger rod bias 348 may instead be used. One end of the plunger rod bias 348 is in engagement with a laterally, or radially, extending shoulder 314 of the plunger rod 307 and the other end is in engagement with a catch 324. In other embodiments, the plunger rod bias 348 may be arranged differently so as to provide the biasing force on the plunger rod 307, for example one end of the plunger rod bias 348 may be differently coupled or affixed to the plunger rod 307 (for example the shoulder 314 thereof may not be provided but instead an end of the plunger bias may be threaded through a laterally extending aperture provided in the plunger rod 307) and the other end of the plunger rod bias 348 may be coupled or affixed to, or otherwise in engagement with, another feature restrained with respect to the body 301 other than the catch 324, such as the body 301 itself.

The catch 324 in this embodiment comprises a collar 353 arranged to extend peripherally around the plunger rod 307. Thus, the plunger rod 307 is slidably received within the catch 324. The catch 324 is restrained in the distal direction with respect to the body 301 such that the plunger rod bias 348 biases the plunger rod 307 in the distal direction away from the catch 324. In this embodiment, the catch 324 is affixed to the body 301 so as to provide the longitudinal restraint of the catch 324.

The plunger rod 307 comprises a plunger rod aperture 332 and the catch 324 comprises a corresponding catch aperture 336. In the pre-use configuration shown in FIG. 3, the plunger rod aperture 332 and the catch aperture 336 are aligned with each other. In the pre-use configuration, a locking element 328 is in a first position so as to be received by both the plunger rod aperture 332 and the catch aperture 336, the locking element 328 extending from the plunger rod aperture 332 to the catch aperture 336. Thus, the locking element 328 extends from the plunger rod aperture 332 so as to engage the catch aperture 336. The locking element 328 is in engagement with a plunger rod engagement surface 309 of a wall 334 of the plunger rod aperture 332 and a catch engagement surface 326 of a wall 338 the catch aperture 336 so as to be arranged therebetween. This engagement of the locking element 328 couples, or locks, the plunger rod 307 to the catch 324 so as to prevent the plunger rod 307 from moving in the distal direction under the action of the biasing force provided by the plunger rod bias 348. In this embodiment the locking element 328 is a sphere or ball although, in other embodiments, the locking element 328 may take any suitable configuration, for example in other embodiments the locking element 328 may instead be a cylinder. The locking element 328 therefore retains the plunger rod 307 in the pre-use configuration, against the biasing force provided by the plunger rod bias 348.

The plunger rod 307 comprises a longitudinally extending aperture 343. A longitudinally extending release member 330, in this embodiment embodied by a release pin 341, is slidably received within the longitudinally extending aperture 343. The release member 330 is movable with respect to the plunger rod 307 in a proximal direction from a blocking position (shown in FIGS. 3 and 4A) to a release position (shown in FIG. 4D).

In the blocking position of the release member 330, the release member 330 occupies the plunger rod aperture 332 so as to maintain the locking element 328 in engagement with the catch engagement surface 326 of the catch aperture 336 such that the plunger rod 307 is coupled to the catch 324, thereby preventing the plunger rod 307 from moving in the distal direction.

The release member 330 is coupled, e.g. affixed to, a needle shield 366. In this embodiment, the catch 324 and plunger rod 307 are received within the needle shield 366, thus the needle shield 366 is configured to extend peripherally around the catch 324 and the plunger rod 307. The needle shield 366 is configured to be movable in a proximal direction (opposite to the distal direction) from an extended position in which the needle shield 366 is configured to cover a needle (not shown) of a medicament container (not shown) when the medicament container is received by the body 301 to a retracted position in which the needle shield 366 is configured to expose the needle of the medicament container for injection. When the needle shield 366 moves proximally, e.g. from the extended position to the retracted position, the release member 330 is caused to move from the blocking position (shown in FIGS. 3 and 4A) to the release position (shown in FIG. 4D).

When the release member 330 moves to the release position, the release member 330 slides proximally within the longitudinally extending aperture 343 of the plunger rod 307 such that the release member 330 no longer occupies an axial position of the catch aperture 336, thereby providing space within the plunger rod aperture 332 for the locking element 328 to move into. Thus, the release member 330 no longer maintains the locking element 328 in the first position and the locking element 328 is permitted to move radially inwards to a second position in which a greater portion of the locking element 328 is received by the plunger rod aperture 332 and thus in which the locking element 328 is no longer in engagement with the catch engagement surface 326 such that the locking element 328 is no longer in engagement with the catch 324. Thus, in the second position of the locking element 328, the plunger rod 307 is decoupled from the catch 324 and thus the plunger rod 307 is free to move distally, biased by the biasing force provided by the plunger rod bias 348.

With reference again to FIGS. 3 and 4A, the locking element 328 is biased from the first position into the second position, the locking element 328 being maintained in the first position, and therefore prevented from moving to the second position, by the release member 330. The catch engagement surface 326 comprises a ramped surface 352 which is in engagement with the locking element 328 when the locking element 328 is in the first position. Under the action of the biasing force provided by the plunger rod bias 348, the plunger rod engagement surface 309 presses the locking element 328 against the catch engagement surface 326. As the catch engagement surface 326 comprises a ramped surface 352, a component of the plunger rod biasing force is reacted to the locking element 328 via the ramped surface 352, the force component acting on the locking element 328 so as to bias the locking element 328 into the second position. Thus, when the release member 330 is moved to the release position, the locking element 328 is caused to move to the second position, under the action of the biasing force provided by the plunger rod bias 348.

While some devices 300 may comprise only a single locking arrangement (namely, the locking element 328, catch aperture 336, catch engagement surface 326, ramped surface 352, plunger rod aperture 332, and plunger rod engagement surface 309) others, such as that shown in FIGS. 3 and 4A to 4D, may comprise a plurality of such locking arrangements. These other locking arrangements may be substantially identical to the locking arrangement described above, as will be apparent from the discussion which follows. In some embodiments, the plurality of locking arrangements may be spaced apart from each other in a longitudinal direction such that their respective locking elements are caused to sequentially move to their respective second positions as the release member 330 is caused to move proximally. In some embodiments, each locking arrangement may also have its own release member 330 (for example slidably received within its own, or with a common, longitudinally extending aperture 343), or as in the embodiment disclosed herein below, a common release member 330 may be shared between each of the plurality of locking elements 328, In the embodiment of FIGS. 3 and 4A to 4D, the device 300 comprises a second locking element 359. In the same way as the first locking element 328 described above, the second locking element 359 is moveable between a first and a second position. In the first position, the second locking element 359 is received by a second plunger rod aperture 369 and by a second catch aperture 373. Thus the second locking element 359 extends from the second plunger rod aperture 369 so as to engage the second catch aperture 373. In the first position, the second locking element 359 is therefore in engagement with a second plunger rod engagement surface 357 of a wall 371 of the second plunger rod aperture 369 and a second catch engagement surface 356 of a wall 375 of the second catch aperture 373 so as to be arranged therebetween. This engagement of the second locking element 359 couples the plunger rod 307 to the catch 324 so as to prevent the plunger rod 307 from moving in the distal direction under the action of the biasing force provided by the plunger rod bias 348. In this embodiment the second locking element 359 is also a sphere or ball although in other embodiments, the second locking element 359 may take any suitable configuration, for example in other embodiments the second locking element 359 may instead be a cylinder.

In the blocking position of the release member 330, the release member 330 occupies the second plunger rod aperture 369 so as to maintain the second locking element 359 in engagement with the second catch engagement surface 356 of the second catch aperture 373 such that the plunger rod 307 is coupled to the catch 324, thereby preventing the plunger rod 307 from moving in the distal direction.

When the release member 330 moves to the release position (shown in FIG. 4D), the release member 330 slides proximally within the longitudinally extending aperture 343 of the plunger rod 307 such that the release member 330 no longer occupies an axial position of the second catch aperture 373, thereby providing space within the second plunger rod aperture 332 for the second locking element 359 to move into. Thus, the release member 330 no longer maintains the second locking element 359 in the first position and the second locking element 359 is permitted to move radially inwards to the second position in which a greater portion of the second locking element 359 is received by the second plunger rod aperture 369 and thus in which the second locking element 359 is no longer in engagement with the second catch engagement surface 356 such that the second locking element 359 is no longer in engagement with the catch 324. Thus, in the second position of the second locking element 359, the plunger rod 307 is decoupled from the catch 324 and thus the plunger rod 307 is free to move distally, biased by the biasing force provided by the plunger rod bias 348.

With reference again to FIGS. 3 and 4A, the second locking element 359 is biased from its first position into its second position, the second locking element 359 being maintained in its first position, and therefore prevented from moving to its second position, by the release member 330. The second catch engagement surface 356 comprises a ramped surface 376 which is in engagement with the second locking element 359 when the second locking element 359 is in its first position. Under the action of the biasing force provided by the plunger rod bias 348, the second plunger rod engagement surface 357 presses the second locking element 359 against the second catch engagement surface 356. As the second catch engagement surface 356 comprises a second ramped surface 376, a component of the plunger rod biasing force is reacted to the second locking element 359 via the second ramped surface 376, the force component acting on the second locking element 359 so as to bias the second locking element 359 into its second position. Thus, when the release member 330 is moved to the release position, the second locking element 359 is caused to move to its second position under the action of the biasing force provided by the plunger rod bias 348.

Figure 4A:
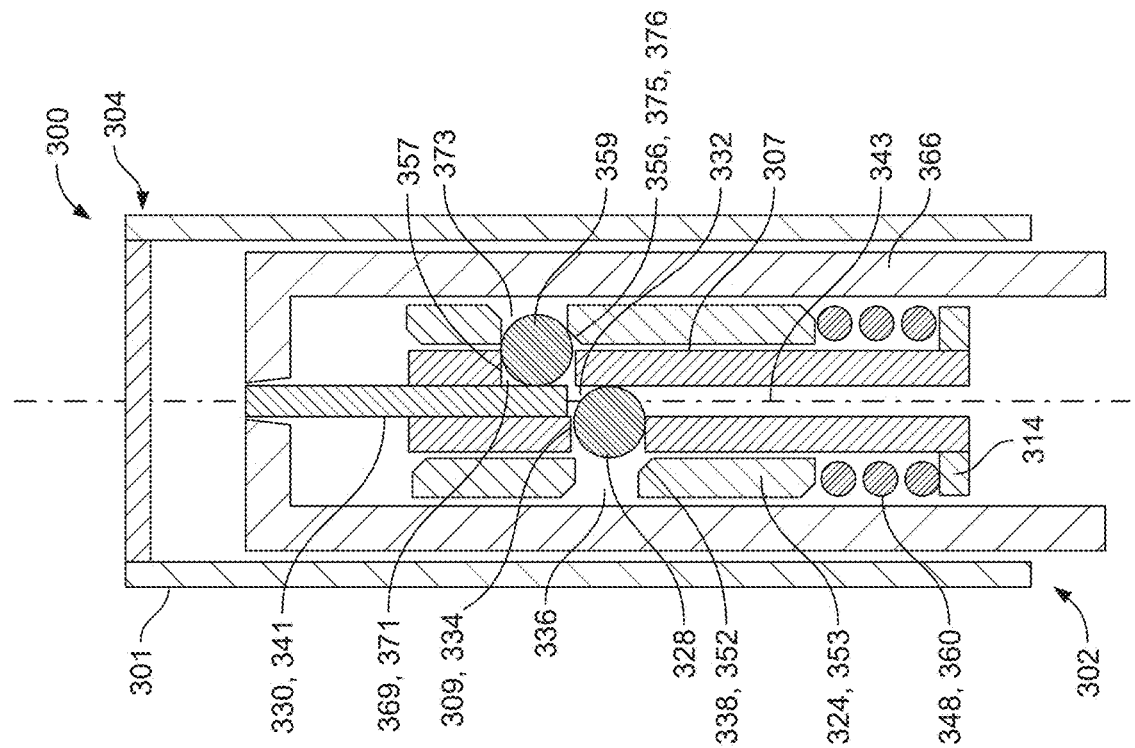
FIG. 4A is a schematic cross-sectional view of the medicament delivery device of FIG. 3 in the pre-use configuration.

The second locking element 359 is spaced apart from the first locking element 328 in a longitudinal direction of the body 301 such that the first locking element 328 and the second locking element 359 are caused to move to their respective second positions sequentially as the release member 330 moves from the blocking position shown in FIG. 4A to the release position shown in FIG. 4D. Only when both of the first 328 and second 359 locking elements are in their respective second positions is the plunger rod 307 decoupled from the catch 324 such that the plunger rod 307 is permitted to move in the distal direction under the action of the biasing force provided by the plunger rod bias 348. The second locking element 359 may be angularly spaced apart from the first locking element 328 about the longitudinal axis 306 by any suitable angle, for example, in the embodiment of FIGS. 3 and 4A to 4D, the second locking element 359 is diametrically opposed to the first locking element 328.

In some embodiments, the release member 330 may have a recess or notch (not shown) configured to align with the locking element 328 in the release position so as to allow the locking element to move to its second position. In embodiments, having a plurality of locking elements 328, 359 the release member 330 may have a plurality of recesses or notches spaced along the longitudinal length of the release member 330 such that, when the release member 330 is in the release position, each recess is aligned with a corresponding locking element 328, 359 so as to permit each locking element 328, 359 to move to its second position.

A method of operating the device 300 is now described with reference to FIGS. 4A to 4D. Initially, as shown in FIG. 4A, the device 300 is in a pre-use configuration in which the first 328 and second 359 locking elements are maintained in their respective first positions by the release member 330 so as to engage their respective first 336 and second 373 catch apertures and thereby couple the plunger rod 307 to the catch 324 so as to prevent to plunger rod 307 moving distally under the action of the biasing force provided by the plunger rod bias 348.

In a first step, the needle shield 366 is moved in a proximal direction, for example as a result of a user placing the device 300 at an injection site so as to cause the needle shield 366 to move from an extended position to a retracted position so as to expose a needle of a medicament container when the medicament container is received by the body 301. As the release member 330 is coupled to the needle shield 366, movement of the needle shield 366 in the proximal direction causes the release member 330 to move in the proximal direction so as to slide within the longitudinally extending aperture 343 of the plunger rod 307.

Figure 4B:
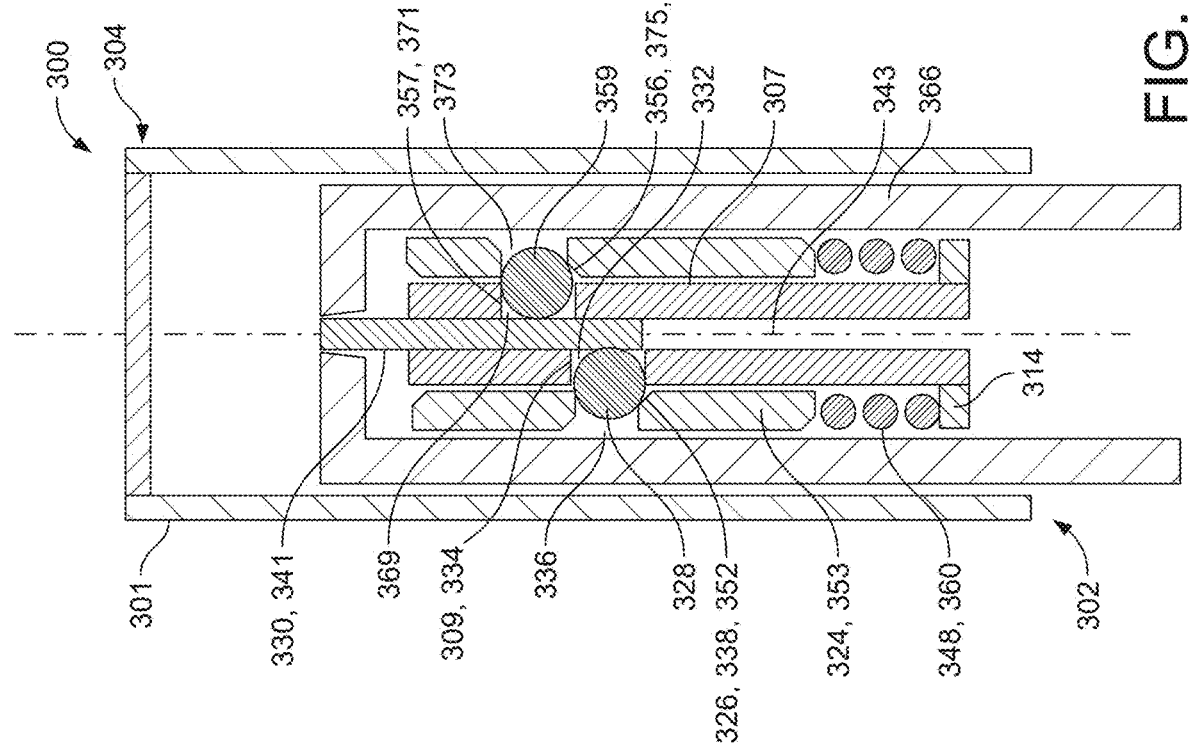
FIG. 4B is a schematic cross-sectional view of the medicament delivery device of FIG. 3 in which a first locking element has moved to from a first position to a second position as a needle shield of the device moves in a proximal direction towards a retracted position.

When the release member 330 has moved a first distance in the proximal direction, as shown in FIG. 4B, a distal-most end of the release member 330 has moved past the first plunger rod aperture 332 such that the first locking element 328 is no longer maintained in its first position in which it is in engagement with the first catch aperture 336 and thus the first locking element 328 is permitted to move to its second position in which the first locking element 328 is no longer in engagement with the first catch aperture 336. Biased by the force component provided by the biasing force of the plunger rod bias 348 reacted through the first ramped surface 352, the first locking element 328 is caused to move radially inwards so as to be further received by the first plunger rod aperture 332 to its second position in which the first locking element 328 is not in engagement with the first catch aperture 336.

The needle shield continues to move proximally until the release member 330 has moved a second distance in the proximal direction, as shown in FIG. 4C. At this second distance, a distal-most end of the release member 330 have moved past the second plunger rod aperture 369 such that the second locking element 359 is no longer maintained in its first position in which it is in engagement with the second catch aperture 373 and thus the second locking element 359 is permitted to move to its second position in which the second locking element 359 is no longer in engagement with the second catch aperture 373. Biased by the force component provided by the biasing force of the plunger rod bias 348 reacted through the second ramped surface 376, the second locking element 359 is caused to move radially inwards so as to be further received by the second plunger rod aperture 369 to its second position in which the second locking element 359 is not in engagement with the second catch aperture 373.

With the first 328 and second 359 locking elements now in their respective second positions, the plunger rod 307 is decoupled from the catch 324 such that the catch 324 no longer prevents movement of the plunger rod 307 in the distal direction. As shown in FIG. 4D, the plunger rod 307 is then caused to move in the distal direction as a result of the biasing force provided by the plunger rod bias 348.

The medicament delivery devices described herein may have some or all of the features as described in relation to the medicament delivery device 200.

The dispensing mechanism 229 may have the some or all of the features as described and/or contemplated in relation to FIGS. 2A to 2G.

In another embodiment, the dispensing mechanism may have alternative or additional features to those described and/or contemplated in relation to FIGS. 2A to 2G. The dispensing mechanism may have features as described and/ or contemplated herein, for example in relation to FIGS. 1A and 1B.

The dispensing mechanism provides one or more automated functions. For example, one or more of needle insertion, medicament injection, and needle retraction can be automated. Energy for one or more automation steps can be provided by one or more energy sources. Energy sources can include, for example, mechanical, pneumatic, chemical, or electrical energy. For example, mechanical energy sources can include springs, levers, elastomers, or other mechanical mechanisms to store or release energy. One or more energy sources can be combined into a single device. Devices can further include gears, valves, or other mechanisms to convert energy into movement of one or more components of a device.

The one or more automated functions may each be activated via an activation mechanism. Such an activation mechanism can include one or more of a button, a lever, a needle sleeve, or other activation component. Activation of an automated function may be a one-step or multi-step process. That is, a user may need to activate one or more activation components in order to cause the automated function. For example, in a one-step process, a user may depress a needle sleeve against their body in order to cause injection of a medicament. Other devices may require a multi-step activation of an automated function. For example, a user may be required to depress a button and retract a needle shield in order to cause injection.

In addition, activation of one automated function may activate one or more subsequent automated functions, thereby forming an activation sequence. For example, activation of a first automated function may activate at least two of needle insertion, medicament injection, and needle retraction. Some devices may also require a specific sequence of steps to cause the one or more automated functions to occur. Other devices may operate with a sequence of independent steps.

Some delivery devices can include one or more functions of a safety syringe, pen-injector, or auto-injector. For example, a delivery device could include a mechanical energy source configured to automatically inject a medicament (as typically found in an auto-injector) and a dose setting mechanism (as typically found in a pen-injector).

The medicament delivery device can include various types of safety syringe, pen-injector, or auto-injector. The device can include a cartridge-based system that requires piercing a sealed ampule before use.

Distal movement of the actuation member may cause automatic dispensing of the medicament from the device and/or distal movement of the actuation member may cause the distal movement of the needle from a needle pre-use position to a needle injection position. The dispensing mechanism may be configured to dispense medicament from the needle when the dispensing mechanism is released.

In the needle pre-use position the needle may be flush with the distal end of the body or the needle may be recessed within the body. In another embodiment the needle may be fixed in position relative to the body.

In another device, different features may be provided to prevent the actuation member from moving distally. For example, the stop may be provided on another component of the medicament delivery device. In another device a lock ring 216 is not present.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g., a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu(B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29)(N-tetradecanoyl)-des(B30) human insulin(insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091 March-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

Those of skill in the art will understand that modifications (additions and/or removals) of various components of the embodiments described herein may be made without departing from the full scope and spirit of the present invention, which encompass such modifications and any and all equivalents thereof.

LIST OF FEATURES

10—Device
11—housing
12—cap
13—needle sleeve
17—needle
20—distal region
21—proximal region
22—button
23—piston
200—medicament delivery device
201—body
202—distal end of the body
208—locking member
216—lock ring
217—needle
223—plunger
227—actuation member
228—button
229—dispensing mechanism
232—injection site
240—spring guide
242—protrusions
250—syringe
254—cap
258—stop
260—spring
262—spring
264—clip
265—proximal opening
266—needle shield
267—collar
268—collar
300—medicament delivery device
301—body
302—distal end of the body
304—proximal end of the body
306—longitudinal axis of the body
307—plunger rod
309—plunger rod engagement surface
314—plunger rod shoulder
324—catch
326—catch engagement surface
328—locking element
330—release member
332—plunger rod aperture
334—wall of plunger rod aperture
336—catch aperture
338—wall of catch aperture
341—pin
343—longitudinally extending aperture of plunger rod
348—plunger rod bias
352—ramped surface
353—collar
356—second catch engagement surface
357—second plunger rod engagement surface
359—second locking element
360—compression spring
366—needle shield
369—second plunger rod aperture
371—wall of second plunger rod aperture
373—second catch aperture
375—wall of the second catch aperture
376—second ramped surface

The invention claimed is:

1. A medicament delivery device for injecting medicament, wherein the medicament delivery device comprises:
a body comprising a distal end, a proximal end and a longitudinal axis extending from the distal end to the proximal end;
a plunger rod configured to be movable in a distal direction of the body, the plunger rod comprising a plunger rod aperture, wherein a wall of the plunger rod aperture comprises a plunger rod engagement surface;
a catch restrained in the distal direction with respect to the body, the catch comprising a catch aperture, wherein a wall defining the catch aperture comprises a catch engagement surface;
a locking element moveable from a first position to a second position;
wherein, in the first position, the locking element is configured to be in engagement with the plunger rod engagement surface and the catch engagement surface such that movement of the plunger rod in the distal direction is prevented;
wherein, in the second position, the locking element is configured to be in engagement with the plunger rod engagement surface but not the catch engagement surface such that movement of the plunger rod in the distal direction is permitted; and
a release member configured to be moveable from a blocking position, in which the release member is configured to prevent the locking element from moving from the first position to the second position, to a release position, in which the release member is configured to permit the locking element to move from the first position to the second position, wherein the release member is configured to at least partially occupy the plunger rod aperture when the release member is in the blocking position so as to prevent the locking element from moving to the second position.

2. The medicament delivery device according to claim 1, wherein, in the first position, the locking element is received by the plunger rod aperture and by the catch aperture and, in the second position, the locking element is received by the plunger rod aperture but the locking element is not received by the catch aperture so as to not be in engagement with the catch engagement surface such that movement of the plunger rod in the distal direction is permitted.

3. The medicament delivery device according to claim 1, wherein the release member is moveable with respect to the plunger rod in a proximal direction from the blocking position to the release position.

4. The medicament delivery device according to claim 1, wherein the release member comprises a longitudinally extending pin slidably received within a longitudinally extending aperture provided within the plunger rod.

5. The medicament delivery device according to claim 1, wherein the body is configured to receive a medicament container comprising a needle and wherein the medicament delivery device comprises a needle shield configured to be movable in a proximal direction from an extended position, in which the needle shield is configured to cover the needle of the medicament container when the medicament container is received by the body, to a retracted position, in which the needle shield is configured to expose the needle of the medicament container when a medicament container is received by the body, the needle being exposed for injection, wherein the release member is coupled to the needle shield such that movement of the needle shield from the extended position to the retracted position causes the release member to move from the blocking position to the release position.

6. The medicament delivery device according to claim 1, wherein the locking element is substantially spherical or cylindrical.

7. The medicament delivery device according to claim 1, wherein, in the first position, the locking element is biased into the second position.

8. The medicament delivery device according to claim 7, wherein the medicament delivery device comprises a plunger rod bias configured to provide a biasing force to bias the plunger rod in the distal direction.

9. The medicament delivery device according to claim 8, wherein the catch engagement surface comprises a ramped surface such that, when the locking element is in the first position, the locking element is in engagement with the ramped surface such that the biasing force provided by the plunger rod bias is transferred to the locking element through the ramped surface so as to bias the locking element to the second position.

10. The medicament delivery device according to claim 1, wherein the catch comprises a collar arranged to extend peripherally around the plunger rod when the plunger rod is in the first position.

11. The medicament delivery device according to claim 1, wherein the catch engagement surface is a first catch engagement surface, the plunger rod engagement surface is a first plunger rod engagement surface, the locking element is a first locking element, and wherein the catch comprises a second catch engagement surface, the plunger rod comprises a second plunger rod engagement surface, and wherein the medicament delivery device comprises a second locking element moveable from a first position to a second position, wherein, in the first position, the second locking element is configured to be in engagement with the second plunger rod engagement surface and the second catch engagement surface such that movement of the plunger rod with respect to the catch in the distal direction is prevented, wherein, in the second position, the second locking element is configured to be in engagement with the second plunger rod engagement surface but not the second catch engagement surface such that movement of the plunger rod in the distal direction is permitted, wherein, in the blocking position of the release member, the release member is configured to prevent the second locking element from moving from the first position to the second position and wherein, in the release position, the release member is configured to permit the second locking element to move from the first position to the second position.

12. The medicament delivery device according to claim 11, wherein the plunger rod aperture is first plunger rod aperture and wherein the plunger rod comprises a second plunger rod aperture, wherein a wall of the second plunger rod aperture comprises the second plunger rod engagement surface and wherein the catch aperture is a first catch aperture and wherein the catch comprises a second catch aperture, wherein a wall defining the second catch aperture comprises the second catch engagement surface.

13. The medicament delivery device according to claim 12, wherein, in the first position of the second locking element, the second locking element is received by the second plunger rod aperture and by the second catch aperture and, in the second position of the second locking element, the second locking element is received by the second plunger rod aperture but the second locking element is not received by the second catch aperture so as to not be in engagement with the second catch engagement surface such that movement of the plunger rod in the distal direction is permitted.

14. The medicament delivery device according to claim 11, wherein, in the first position of the second locking element, the second locking element is biased into the second position of the second locking element.

15. A method of operating a medicament delivery device, the medicament delivery device comprising a body comprising a distal end, a proximal end and a longitudinal axis extending from the distal end to the proximal end, a plunger rod configured to be movable in a distal direction of the body, the plunger rod comprising a plunger rod aperture, wherein a wall of the plunger rod aperture comprises a plunger rod engagement surface, a catch restrained in the distal direction with respect to the body, the catch comprising a catch aperture, wherein a wall defining the catch aperture comprises a catch engagement surface, a locking element moveable from a first position to a second position, wherein, in the first position, the locking element is configured to be in engagement with the plunger rod engagement surface and the catch engagement surface such that movement of the plunger rod in the distal direction is prevented, wherein, in the second position, the locking element is configured to be in engagement with the plunger rod engagement surface but not the catch engagement surface such that movement of the plunger rod in the distal direction is permitted, and a release member configured to be moveable from a blocking position in which the release member is configured to prevent the locking element from moving from the first position to the second position to a release position in which the release member is configured to permit the locking element to move from the first position to the second position, wherein the release member is configured to at least partially occupy the plunger rod aperture when the release member is in the blocking position so as to prevent the locking element from moving to the second position, the method comprising:

moving the release member from the blocking position to the release position so as to permit the locking element to move from the first position to the second position so as to permit the plunger rod to move in a distal direction of the body.

16. The method according to claim 15, wherein the medicament delivery device comprises a plunger rod bias configured to provide a biasing force to bias the plunger rod in the distal direction, and wherein the method comprises:

causing the plunger rod to move in the distal direction under action of the biasing force provided by the plunger rod bias.

17. The method according to claim 16, wherein the catch engagement surface comprises a ramped surface such that, when the locking element is in the first position, the locking element is in engagement with the ramped surface such that the biasing force provided by the plunger rod bias is reacted to the locking element through the ramped surface so as to bias the locking element to the second position, the method comprising:

moving the release member from the blocking position to the release position so as to cause the locking element to move from the first position to the second position under the action of the biasing force provided by the plunger rod bias so as to permit the plunger rod to move in a distal direction of the body.

18. A medicament delivery device for injecting medicament, wherein the medicament delivery device comprises:

a body comprising a distal end, a proximal end and a longitudinal axis extending from the distal end to the proximal end;

a plunger rod configured to be movable in a distal direction of the body, the plunger rod comprising a plunger rod aperture;

a catch restrained in the distal direction with respect to the body, the catch comprising a catch aperture;

a locking element moveable from a first position to a second position;

wherein, in the first position, the locking element is configured to be received by the plunger rod aperture and to protrude laterally therefrom so as to engage the catch aperture such that movement of the plunger rod in the distal direction is prevented;

wherein, in the second position, the locking element is configured to be received by the plunger rod aperture, the locking element being arranged so as to not engage the catch aperture such that movement of the plunger rod in the distal direction is permitted; and a release member configured to be moveable from a blocking position, in which the release member at least partially occupies the plunger rod aperture so as to prevent the locking element from moving from the first position to the second position, to a release position, in which the release member is configured to permit the locking element to move from the first position to the second position.

\* \* \* \* \*